United States Patent
Richardson et al.

(10) Patent No.: US 9,303,670 B2
(45) Date of Patent: Apr. 5, 2016

(54) BONDING ASSEMBLY

(71) Applicant: Zephyros, Inc., Romeo, MI (US)

(72) Inventors: Henry E. Richardson, Washington, MI (US); Jeffery Thomas Shantz, Metamora, MI (US); Alex Mangiapane, Macomb Township, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 14/198,936

(22) Filed: Mar. 6, 2014

(65) Prior Publication Data

US 2014/0186100 A1 Jul. 3, 2014

Related U.S. Application Data

(63) Continuation of application No. 13/423,663, filed on Mar. 19, 2012, now Pat. No. 8,689,516.

(60) Provisional application No. 61/453,786, filed on Mar. 17, 2011.

(51) Int. Cl.
| | |
|---|---|
| *B62D 23/00* | (2006.01) |
| *B62D 27/00* | (2006.01) |
| *F16B 17/00* | (2006.01) |
| *B62D 27/02* | (2006.01) |
| *B62D 29/00* | (2006.01) |

(52) U.S. Cl.
CPC ............ *F16B 17/002* (2013.01); *B62D 27/023* (2013.01); *B62D 27/026* (2013.01); *B62D 29/002* (2013.01); *B62D 29/005* (2013.01); *Y10T 403/472* (2015.01)

(58) Field of Classification Search
CPC .. B29C 65/00; B29C 65/485; B29C 66/1122; B29C 65/4835; B62D 23/005; B62D 29/002; B62D 27/026; B62D 27/023; F16L 13/103
USPC .............. 52/232, 653.2, 655.1, 704; 403/265, 403/268, 365, 367, 372; 156/71, 79, 83, 156/242, 293, 294, 306.6
See application file for complete search history.

(56) References Cited

U.S. PATENT DOCUMENTS

| | | |
|---|---|---|
| 2,997,122 A | 8/1961 | Frey |
| 3,124,626 A | 3/1964 | Graham et al. |
| 3,451,696 A | 6/1969 | Hagelin et al. |

(Continued)

FOREIGN PATENT DOCUMENTS

| | | |
|---|---|---|
| DE | 102009039167 A1 | 3/2011 |
| EP | 2019027 A1 | 1/2009 |

(Continued)

OTHER PUBLICATIONS

International Search Report, Dated Jun. 24, 2008, Application No. PCT/US2008/052004.

(Continued)

*Primary Examiner* — Joshua J Michener
*Assistant Examiner* — Kyle Walraed-Sullivan
(74) *Attorney, Agent, or Firm* — The Dobrusin Law Firm, PC

(57) ABSTRACT

A device and method for the protection of a first member and second member from corrosion by utilizing a connector that bonds the members without allowing direct contact of the members.

20 Claims, 3 Drawing Sheets

(56) References Cited

U.S. PATENT DOCUMENTS

| | | | |
|---|---|---|---|
| 3,586,556 A | 6/1971 | Clark et al. | |
| 4,319,768 A | 3/1982 | Youngdale | |
| 4,332,397 A | 6/1982 | Steger | |
| 4,636,106 A * | 1/1987 | Waisbrod | 403/228 |
| 4,669,759 A * | 6/1987 | Harbeke | 285/136.1 |
| 4,735,355 A | 4/1988 | Browning | |
| 4,753,355 A * | 6/1988 | Hall et al. | 211/105.1 |
| 4,810,548 A | 3/1989 | Ligon et al. | |
| 4,850,385 A * | 7/1989 | Harbeke | 137/75 |
| 4,916,800 A * | 4/1990 | Harbeke | 29/469 |
| 4,922,596 A | 5/1990 | Wycech | |
| 4,978,562 A | 12/1990 | Wycech | |
| 4,981,287 A | 1/1991 | Cothenet | |
| 5,124,186 A | 6/1992 | Wycech | |
| 5,243,874 A * | 9/1993 | Wolfe et al. | 74/493 |
| 5,266,133 A | 11/1993 | Hanley | |
| 5,344,208 A | 9/1994 | Bien et al. | |
| 5,358,397 A | 10/1994 | Ligon et al. | |
| 5,431,363 A | 7/1995 | Ezzat et al. | |
| 5,487,803 A | 1/1996 | Sweeney et al. | |
| 5,506,025 A | 4/1996 | Otto et al. | |
| 5,552,095 A | 9/1996 | Merser et al. | |
| 5,571,355 A | 11/1996 | Kornylo | |
| 5,575,526 A | 11/1996 | Wycech | |
| 5,686,509 A | 11/1997 | Nakayama | |
| 5,720,102 A * | 2/1998 | McClanahan | 29/898.12 |
| 5,743,979 A | 4/1998 | Lorbiecki | |
| 5,755,486 A | 5/1998 | Wycech | |
| 5,766,719 A | 6/1998 | Rimkus | |
| 5,884,960 A | 3/1999 | Wycech | |
| 5,904,024 A | 5/1999 | Miwa | |
| 5,932,680 A | 8/1999 | Heider | |
| 5,933,680 A | 8/1999 | Nishimura | |
| 5,997,786 A | 12/1999 | Arthur et al. | |
| 6,030,701 A | 2/2000 | Johnson et al. | |
| 6,068,424 A | 5/2000 | Wycech | |
| 6,074,506 A | 6/2000 | Herring, Jr. et al. | |
| 6,103,341 A | 8/2000 | Barz et al. | |
| 6,131,897 A | 10/2000 | Barz et al. | |
| 6,199,940 B1 | 3/2001 | Hopton et al. | |
| 6,247,287 B1 | 6/2001 | Takabatake | |
| 6,270,600 B1 | 8/2001 | Wycech | |
| 6,293,572 B1 | 9/2001 | Robbins | |
| 6,332,731 B1 | 12/2001 | Wycech | |
| 6,368,438 B1 | 4/2002 | Chang et al. | |
| 6,379,762 B1 | 4/2002 | Omichinski | |
| 6,382,635 B1 | 5/2002 | Fitzgerald | |
| 6,422,575 B1 | 7/2002 | Czaplicki | |
| 6,467,834 B1 | 10/2002 | Barz | |
| 6,468,613 B1 | 10/2002 | Kitano et al. | |
| 6,471,285 B1 | 10/2002 | Czaplicki et al. | |
| 6,482,486 B1 | 11/2002 | Czaplicki | |
| 6,511,120 B1 | 1/2003 | Mitts | |
| 6,523,857 B1 | 2/2003 | Hopton | |
| 6,530,577 B1 | 3/2003 | Busby et al. | |
| 6,543,976 B1 | 4/2003 | Malofsky | |
| 6,585,202 B2 | 7/2003 | Broccardo | |
| 6,668,457 B1 | 12/2003 | Czaplicki | |
| 6,719,293 B1 | 4/2004 | Coles | |
| 6,786,533 B2 | 9/2004 | Bock et al. | |
| 6,793,274 B2 | 9/2004 | Riley et al. | |
| 6,808,774 B2 | 10/2004 | Autterson et al. | |
| 6,855,652 B2 | 2/2005 | Hable et al. | |
| 6,890,021 B2 | 5/2005 | Bock et al. | |
| 6,923,499 B2 | 8/2005 | Wieber et al. | |
| 6,941,719 B2 | 9/2005 | Busseuil et al. | |
| 6,953,219 B2 | 10/2005 | Lutz et al. | |
| 6,969,551 B2 | 11/2005 | Richardson et al. | |
| 6,991,237 B2 | 1/2006 | Kassa et al. | |
| 6,998,011 B2 | 2/2006 | Schoenfeld et al. | |
| 7,022,400 B2 | 4/2006 | Bolling | |
| 7,077,460 B2 | 7/2006 | Czaplicki et al. | |
| 7,080,437 B2 * | 7/2006 | da Silva et al. | 29/421.1 |
| 7,105,112 B2 | 9/2006 | Czaplicki et al. | |
| 7,199,165 B2 | 4/2007 | Kassa et al. | |
| 7,249,215 B2 | 7/2007 | Surico et al. | |
| 7,251,915 B2 | 8/2007 | Zimmerman et al. | |
| 7,255,388 B2 | 8/2007 | Le Gall et al. | |
| 7,290,828 B2 | 11/2007 | Kosal et al. | |
| 7,318,873 B2 | 1/2008 | Czaplicki et al. | |
| 7,428,774 B2 | 9/2008 | Thomas et al. | |
| 7,469,459 B2 | 12/2008 | Kosal et al. | |
| 7,484,946 B2 | 2/2009 | Nitsche et al. | |
| 7,494,179 B2 | 2/2009 | Deachin et al. | |
| 7,503,620 B2 | 3/2009 | Brennecke et al. | |
| 7,521,093 B2 | 4/2009 | Finerman et al. | |
| 2002/0024233 A1 | 2/2002 | Kleino | |
| 2002/0164201 A1 | 11/2002 | Lempfer | |
| 2002/0176737 A1 | 11/2002 | Reineke | |
| 2003/0196753 A1 | 10/2003 | Schoenfeld | |
| 2004/0018341 A1 | 1/2004 | Richardson et al. | |
| 2004/0076831 A1 | 4/2004 | Hable et al. | |
| 2004/0124553 A1 | 7/2004 | Czaplicki | |
| 2005/0121942 A1 | 6/2005 | Repp et al. | |
| 2005/0166532 A1 | 8/2005 | Barz | |
| 2005/0175400 A1 | 8/2005 | Behr | |
| 2005/0260399 A1 | 11/2005 | Finerman | |
| 2005/0268454 A1 | 12/2005 | White | |
| 2006/0000186 A1 | 1/2006 | Carlson et al. | |
| 2006/0003044 A1 | 1/2006 | DiNello et al. | |
| 2006/0059807 A1 | 3/2006 | Zimmerman | |
| 2006/0191623 A1 * | 8/2006 | Lutz et al. | 156/94 |
| 2006/0260204 A1 | 11/2006 | Repp et al. | |
| 2007/0045866 A1 | 3/2007 | Gray et al. | |
| 2007/0090560 A1 | 4/2007 | Kassa et al. | |
| 2007/0101679 A1 | 5/2007 | Harthcock | |
| 2007/0134058 A1 | 6/2007 | Meyer | |
| 2007/0257515 A1 | 11/2007 | Larsen et al. | |
| 2007/0281523 A1 * | 12/2007 | Riley | 439/157 |
| 2008/0012263 A1 | 1/2008 | Dickson et al. | |
| 2008/0029200 A1 | 2/2008 | Sheasley | |
| 2008/0061602 A1 | 3/2008 | Czaplicki et al. | |
| 2008/0101856 A1 | 5/2008 | Clawson | |
| 2008/0107883 A1 * | 5/2008 | Chmielewski et al. | 428/219 |
| 2008/0179913 A1 | 7/2008 | Coon et al. | |
| 2008/0226866 A1 | 9/2008 | Vilcek et al. | |
| 2008/0254214 A1 | 10/2008 | Kassa et al. | |
| 2008/0295334 A1 | 12/2008 | Kulesha | |
| 2009/0142130 A1 | 6/2009 | Frisch | |
| 2009/0202294 A1 | 8/2009 | Apfel | |
| 2010/0289242 A1 | 11/2010 | Nitsche et al. | |

FOREIGN PATENT DOCUMENTS

| | | |
|---|---|---|
| FR | 2812268 A1 | 2/2002 |
| FR | 2881458 A1 | 8/2006 |
| GB | 1541482 A | 3/1979 |
| GB | 2224683 A | 5/1990 |
| SU | 1803616 A1 | 3/1993 |
| WO | 00/27920 A1 | 5/2000 |

OTHER PUBLICATIONS

International Search Report, Dated Jun. 19, 2012. Application No. PCT/US2012/029630.

International Search Report, Dated Sep. 23, 2010, Application No. PCT/US2010/035122.

PCT International Preliminary Report on Patentability dated Feb. 19, 2013; International Application No. PCT/US2012/029630.

Chinese Office Action dated Jun. 16, 2015; Application No. 2012800189281.

* cited by examiner

BONDING ASSEMBLY

CLAIM OF PRIORITY

The present application claims the benefit of the filing date of U.S. Provisional Application Ser. No. 61/453,786 (filed Mar. 17, 2011), the entirety of the contents of this application being hereby expressly incorporated by reference.

FIELD OF THE INVENTION

The present invention is predicated upon methods and devices for the protection of two or more members from corrosion by utilizing an insert that bonds the members without allowing direct contact of the members.

BACKGROUND OF THE INVENTION

For many years, fuel economy has become more emphasized in the automotive industry. There are several approaches for reducing the fuel consumption of cars, one is the use of light weight materials such as aluminum. Such materials can reduce the weight of a car, but often lack sufficient strength. As such, bimetallic constructions made of both steel and aluminum have been proposed, but areas of contact between these materials have poor or no corrosion resistance. This corrosion limits the opportunities to provide parts composed of contact zones between two dissimilar metals. The present invention provides an insert that comprises a third material that acts as a connector between the dissimilar metals to bond the dissimilar metals together while preventing direct contact between the metals. The present invention thus allows for the use of lightweight metal in combination with a dissimilar metal while reducing the risk of corrosion-related issues.

U.S. Pat. No. 7,251,915 discloses a frame system for a vehicle comprised of joints for connecting the frame system. The joints disclosed form solid structures including a core material and exterior body material and connect parts composed of similar materials. U.S. Pat. No. 6,412,857 discloses a frame and joint system including modification of the frame members to form weldable connection portions as joints.

Known joint structures are generally utilized for connecting similar materials, as opposed to dissimilar metals. Further, known joint structures are not generally formed as cage-like structures to fit small clearance spaces between two dissimilar metals while also delivering expandable adhesive materials into such small clearance spaces.

Accordingly, in view of the above, there exists a need for structures that prevent contact between dissimilar materials, while delivering adhesive material to areas having minimal clearance size between the dissimilar materials. For example, there is a need for connector structures that Include a cage-like structure for occupying minimal space while still preventing contact between the members being connected. There is also a need for connector structures that deliver expandable adhesive materials into small openings where direct application of the adhesive is challenging due to the small size of the openings. There is a further need for connectors that allow for connection free of any welding steps.

SUMMARY OF THE INVENTION

The present invention meets some or all of the above needs by providing a connector for joining a first member and a second member of a structure. The connector may include a thermally expandable structural adhesive material and a shaped polymeric carrier. The shaped polymeric carrier is configured for carrying the thermally expandable structural adhesive material, spacing the first member from the second member prior to activation for thermal expansion of the structural adhesive material. The connector may thus limit movement of the first member relative to the second member at least prior to activation for thermal expansion of the structural adhesive material. The connector is further configured for matingly engaging at least one of the first or second members prior to connecting the first member with the second member. The expandable material may be shaped and positioned at selective locations around the carrier for defining a plurality of gaps where the first and second member are in direct opposing relation with one another prior to expansion of the expandable material. Upon activation, the expandable structural adhesive material will expand and flow in a direction to fill the gaps in between the first and second member, so that the first and second members are connected together and are insulated relative to each other by the expandable material.

The present invention is further directed toward a frame bonding system for an automotive vehicle comprising a first metallic member and a second member comprising a metallic material that is dissimilar to that of the first member. The system further comprises a polymeric connector portion in contact with the first member and second member, the connector portion including an activatable adhesive material. The system is further formed so that the first and second members do not directly contact one another and are connected only via the connector portion.

The connector and frame bonding system of the present teachings provide an opportunity to integrate lightweight aluminum parts with high-strength steel parts while avoiding the corrosion that generally occurs upon extended contact between such dissimilar metallic materials. The connector not only separates the dissimilar materials hut also includes an expandable adhesive material to adhere the materials together upon activation of the adhesive. Given the minimal space between the two dissimilar materials of the frame system, the cage-like structure of the connector utilizes minimal material and occupies only the small clearances between the dissimilar materials. The connector further provides a means for locating the expandable material in specific areas about the carrier, so that the expandable material fills in the small clearances between the two materials upon activation. Thus, the connector provides a means for delivering the expandable material to desired locations about the first and second frame members, where the small size of the clearance between the two frame members had previously prevented the use of an expandable adhesive.

DETAILED DESCRIPTION

Figure 1:
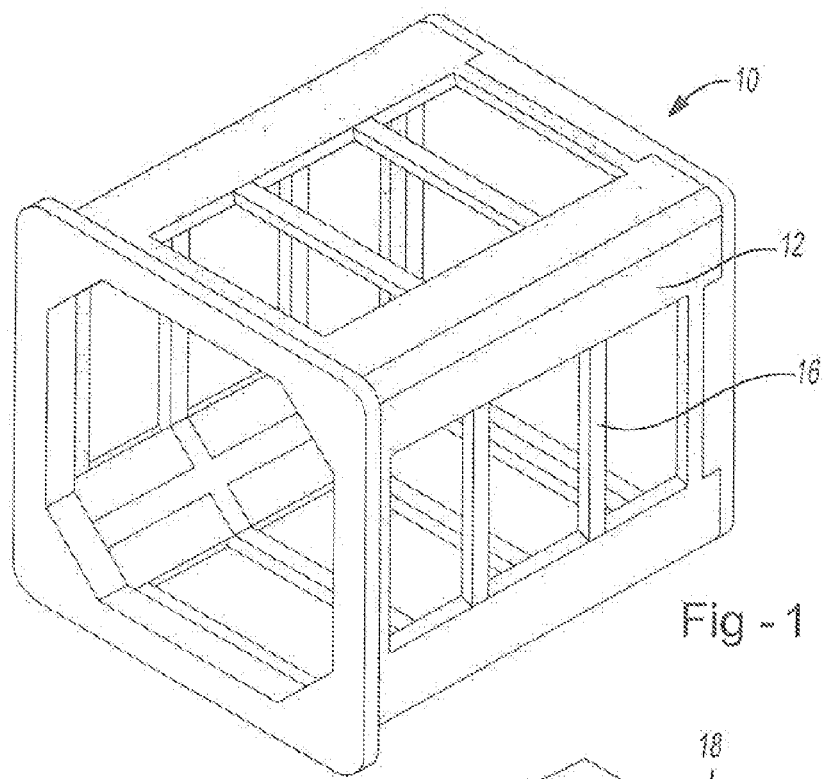
FIG. 1 is a perspective view of an illustrative connector portion in accordance with the present teachings.

The frame bonding system of the present teachings provides a carrier including a plurality of rib structures and an expandable structural adhesive material located onto at least a portion of the carrier. The connector is located into a cavity formed within a first member and a portion of a second member is located into the connector.

The first member and second member may be metallic members. The first member and second member are generally dissimilar metallic members. One of the first or second member may be composed of aluminum, extruded aluminum, aluminum foam, magnesium, magnesium alloys, molded magnesium alloys, titanium, titanium alloys, molded titanium alloys, nickel, copper, transition metals, polyurethanes, polyurethane composites, or any combination thereof. One of the first or second member may be a steel member.

The connector includes a carrier which may be formed of a polymeric material The carrier, including the walls and the ribs may be integrally molded (e.g., injection molded) or formed of a single material that is different from the material of one or more of the first member, the second member, or the expandable adhesive material. Suitable materials can include for example, and without, limitation, a polymeric material such as nylon, polyamide, polyester, polypropylene, polyethylene, molding compound or the like, which may be filled or unfilled (e.g., filled with glass or kevlar reinforcement fibers).

One function of the connector, in addition to separating the first and second members, is to provide a structural member that carries the structural adhesive material. The carrier may thus be contacted with one or more structural adhesive materials which may be expandable materials. Thus, the carrier may include one or more outward facing surfaces onto which a layer of the expandable material is placed. The expandable material may be applied to the surface of the carrier (prior to expansion) at such locations. Optionally, the direction of expansion may be controlled by one or more extensions formed on the carrier, such as those disclosed in U.S. Pat. No. 6,941,719. The expandable may foe formed onto one or more corners of the carrier. One or more spaces formed in between the first member and second member may be of insufficient size to fit the expandable material in its unexpanded state. The carrier may thus be formed to guide the expandable material from its location on the corner portions of the carrier into the small Clearances formed adjacent the corner portions between the first member and second member. The inclusion of the expandable adhesive into these small clearances provide improved strength of adhesion between the first and second members by virtue of the thin bondline formed by the adhesive expanding to these thin openings. The carrier may be substantially rectangular in shape and may thus Include a top surface, a bottom surface, two side surfaces, a front surface and a back surface. Each of these surfaces may be formed of one or more openings, rib structures, solid surfaces, or combinations thereof. Thus, one or more areas directly adjacent (e.g., in direct planar contact with) the top surface, the bottom surface or the two side surfaces may be free of any expandable material in its unexpanded state. Upon activation of the expandable material, the expandable material may foam and extend into the areas directly adjacent one or more of the top surface, the bottom surface, or the two side surfaces.

The expandable adhesive material may be an epoxy based material such as those disclosed In U.S. Pat. Nos. 5,884,960; 6,348,513; 6,368,438; 6,811,864; 7,125,461; 7,249,415; and U.S. Patent Publication Nos. 2004/0076831, and 2008/0029200 hereby incorporated by reference. The expandable material may be generally shaped in a rectangular or block configuration, but may also be shaped as needed or desired depending upon the configuration of the carrier. As an example, the expandable material may he polygonal in shape and farmed along the corner portions of the carrier. More specifically, the expandable material may be pentagonal in shape and aligned along one or more comers of the carrier. Of course, it is contemplated that the material may be applied to carrier as a single piece (e.g., strip) or multiple pieces (e.g., strips). Upon expansion the expandable material may expand vertically initially until contacting any barrier at which point the expandable material may begin to expand in a horizontal direction, thus contacting one or more of the top surface, bottom surface or two side surfaces of the carrier. The expandable material may he able to expand into any gap with a width larger than about 0.5 mm.

The expandable material may be a resinous generally dry to the touch or tacky and may he shaped in any form of desired pattern, placement, or thickness, but is preferably of substantially uniform thickness. Though other heat-activated materials are possible for the expandable material, a preferred heat activated material is an expandable polymer or plastic, and preferably one that is foamable. The expandable material may be a relatively high expansion foam having a polymeric formulation that includes one or more of an epoxy resin, an acetate (e.g. ethylene vinyl acetate), a thermoplastic polyether, an acrylate and/or a methacrylate (e.g., a copolymer of butyl acrylate and methyl acrylate), an epoxy/elastomer adduct, and one or more fillers (e.g., a clay filler, and/or a nanoparticle-containing filler). Preferred thermally expandable materials are disclosed in U.S. Pat. Nos. 7,313,865; 7,125,461; and 7,199,165 incorporated by reference herein for all purposes. For example, and without limitation, the expandable material may also be an EVA/rubber based material, including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. Suitable expandable materials include those available from L&L Products, Inc. under the designations L7220, L2821, L1066, L205, L2010, L2105, L2108A, L2806, L2811, L4200, L4141, L4161, L4315, L5510, L5520, L5540, L5600, L5601, L7102, and L7104.

The expandable material can be formed of other materials provided that the material selected is heat-activated or otherwise activated by an ambient condition (e.g. moisture, pressure, time or the like) and cures under appropriate conditions for the selected application. One such material is the epoxy based resin disclosed in U.S. Pat. No. 6,131,897, the teachings of which are incorporated herein by reference. Some other possible materials include, but are not limited to, polyolefin materials, copolymers and terpolymers with at least one monomer type an alpha-olefin, phenol/formaldehyde materials, phenoxy materials, and polyurethane materials with high glass transition temperatures. Additional materials may also be used such as those disclosed in U.S. Pat. Nos. 5,766,719; 5,755,486; 5,575,526; and 5,932,680, incorporated by reference herein for all purposes.

In applications where the expandable material is a heat activated material, an important consideration involved with the selection and formulation of the material is the temperature at which a material cures and, if expandable, the temperature of expansion. Typically, the material becomes reactive (cures, expands or both) at higher processing temperatures, such as those encountered in an automobile assembly plant, when the material is processed along with the automobile structures at elevated temperatures or at higher applied energy levels, e.g., during coating (e.g., e-coat paint or clearcoat) curing steps. While temperatures encountered in an automobile assembly operation may be in the range of about 148.89° C. to 204.44° C. (about 300° F. to 400° F.) for body shop applications (e.g., e-coat) and, for paint shop applications, are commonly about 93.33° C. (about 200° F.) or slightly higher (e.g., 120° C.-150° C.).

Figure 2:
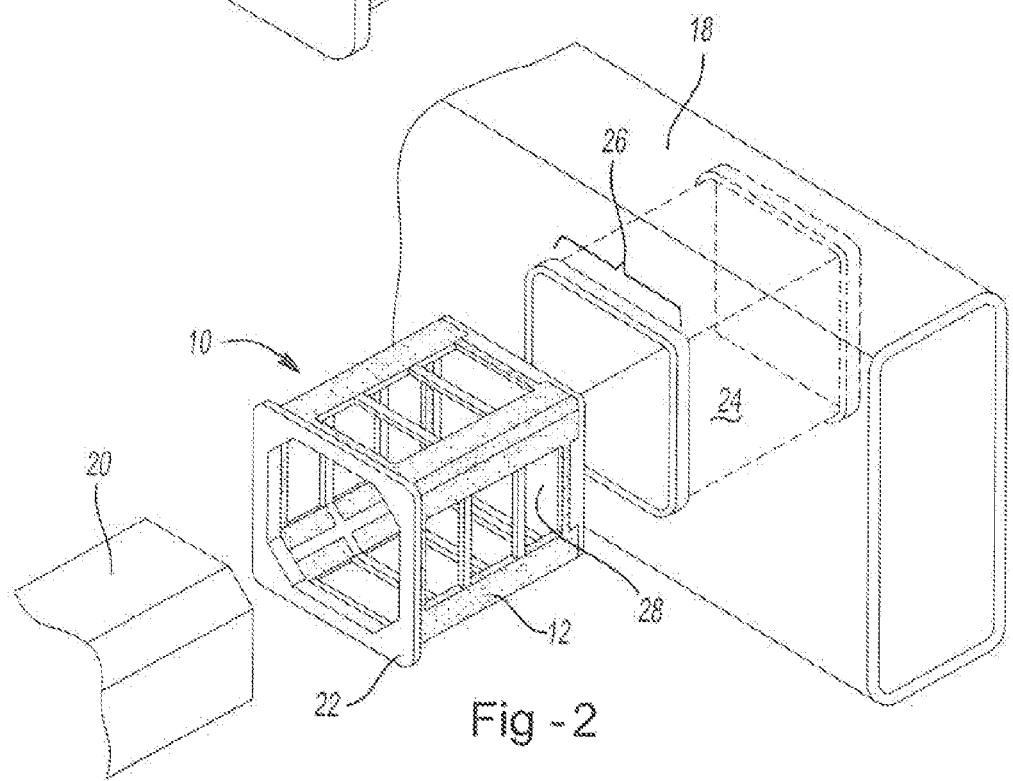
FIG. 2 shows a perspective view of an illustrative example of the bonding assembly in accordance with the present teachings prior to assembly.

As shown for example in FIG. 1, the connector 10 includes a carrier 14 forming a cage structure and an expandable material 12 located thereon. The carrier 14 includes a plurality of rib structures 18, one or more of which may include the expandable material 12. FIG. 2 shows use of the connector 10 to connect a first member 18 and second member 20. The connector 10 may be located within a cavity 24 of the first member 18, while a portion of the second member 20 is located within the confines of the connector 10. The cavity 24 of the first member 18 may include an opening 28 info which the connector 10 is located. The connector may further include a front wall 22, which may be a partial front wall and a back wall 28 which may be a solid wall, or may be a partial wall. The front wall 22 may include an edge (e.g., a lip) that extends beyond the height and width of the opening 28 so that the connector is located in the correct location within the cavity 24 and is prevented from extending further into the cavity 24 than desired.

Figure 3:
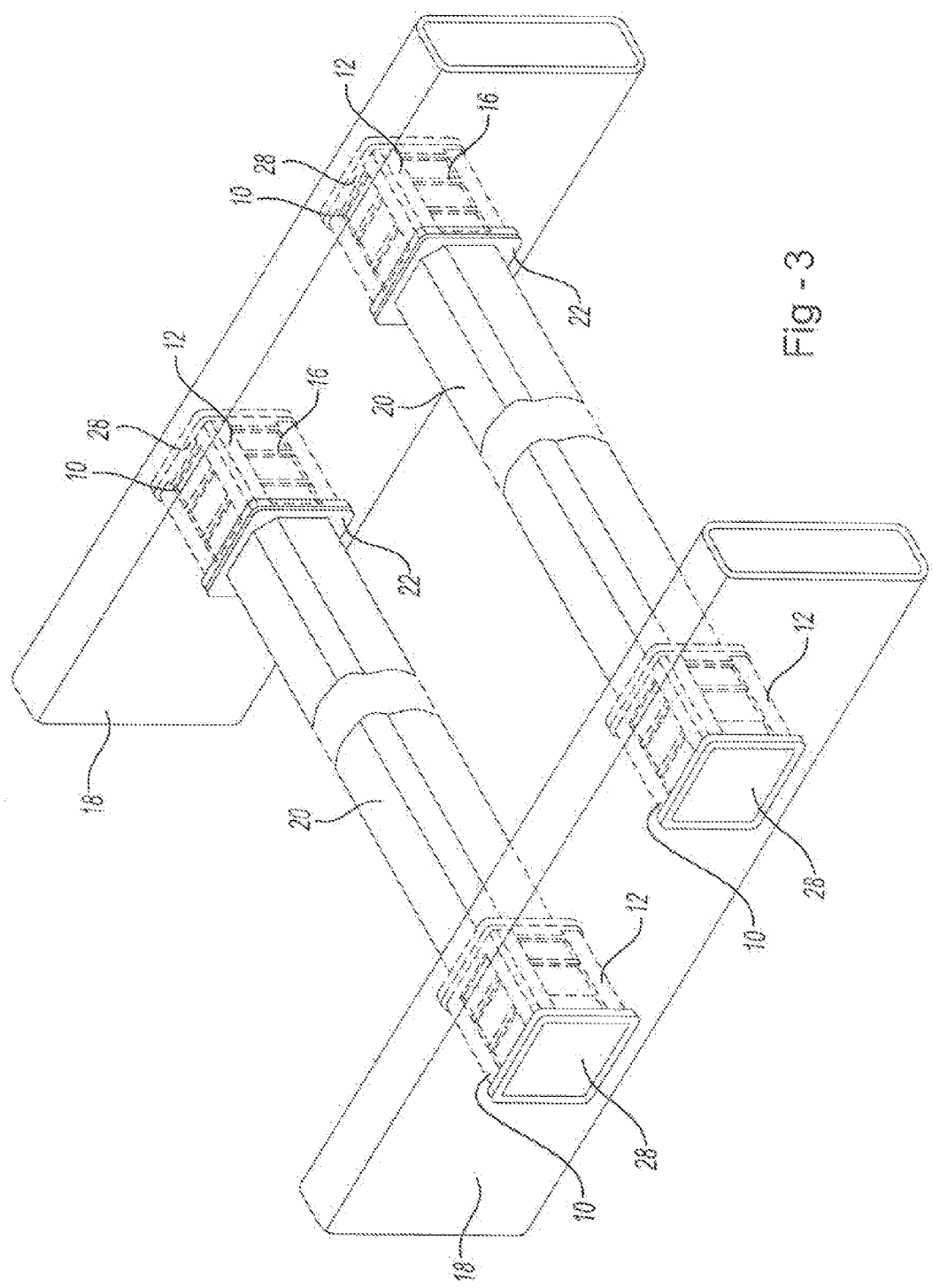
FIG. 3 shows an example of the bonding assembly of FIG. 2 in use with a vehicle frame structure.

As shown for example in FIG. 3, a plurality of connectors 10 may be utilized in a vehicle frame structure. A plurality of first members 18, may each receive a connector 10. A portion of each of a plurality of second frame members 20 may be located within the connectors so that each end of each second frame member 20 is located within a connector. The expandable material 12 may be located in corner areas of the carrier 14 so that upon expansion of the expandable material, the expandable material comes into direct contact with the first member 18. As shown, the carrier 14 includes a front wail having an edge 22 that assists in locating the connector 10 in a desired location such that the edge 22 lies in direct planar contact with the first member.

Figure 4:
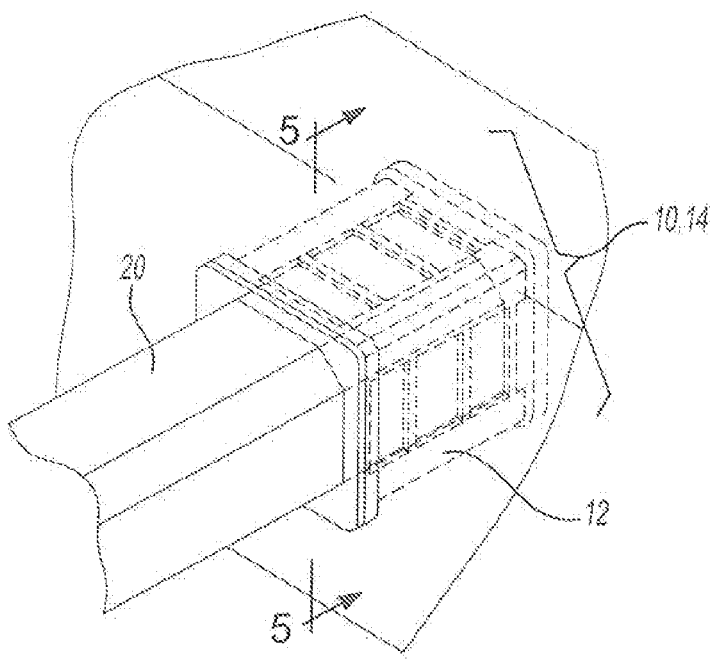
FIG. 4 shows a perspective view of an illustrative example of the bonding assembly in accordance with the present teachings.
Figure 5:
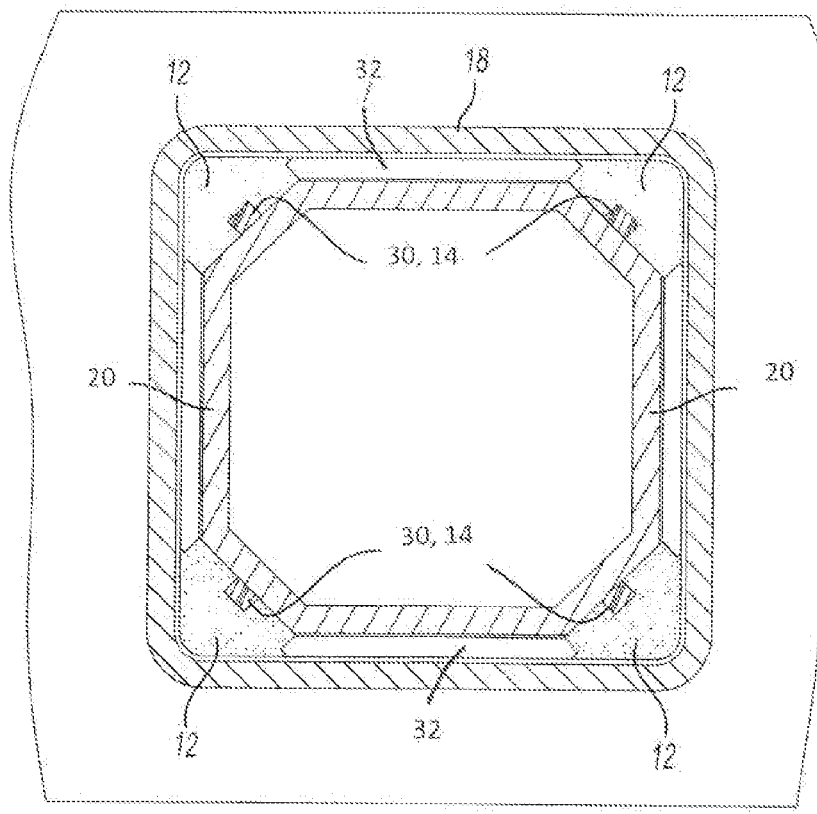
FIG. 5 shows a cross-sectional view of an illustrative example of the bonding assembly in accordance with the present teachings.

FIG. 4 shows a view of one connector 10 located into a cavity of the first member 18. A portion of the second member 20 is located within the confines of the carrier 14. The second member 20 is located into the connector 10 so that the first member 18 and second member 20 are arranged in a substantially perpendicular relationship to one another as shown. FIG. 5 shows a cross sectional view of the connector, depicting the expandable material 12 located onto and partially surrounding a corner rib structure 30 of the carrier 14. The connector 10 is shown located within the first member 18 and the second member 20 is located within the connector 10. The openings 32 between the first member 18 and second member 20, are sufficient to prevent contact (and thus corrosion) between the first member and second member. Upon expansion, the expandable material 12 may expand into the openings 32 to further prevent contact between the first member 18 and second member 20. Alternatively, the connector may include one or more structures to guide the directional expansion of the expandable material and may thus prevent the expandable material from entering the openings 32 or at least a portion of the openings.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the tike is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might fee divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of ail articles and references, including patent applications and publications, are incorporated, by reference for all purposes. The omission in the following claims, of any aspect of subject matter that is disclosed herein is not a disclaimer of such subject matter, nor should it be regarded that the inventors did not consider such subject matter to be part of the disclosed inventive subject matter.

The invention claimed is:

1. A connector for joining a first member and a second member of a structure comprising:
  a shaped polymeric carrier including an expandable adhesive, configured for:
    (i) at least partially locating the second member within a cavity of the first member;
    (ii) preventing direct contact between the first member and the second member;
    (iii) limiting movement of the first member relative to the second member; and (iv) matingly engaging at least one of the first or second members prior to connecting the first member with the second member;
wherein the first and second member are connected together by the shaped polymeric carrier whereby one end of the first member receives the shaped polymeric carrier within the cavity and one end of the second member is received within an opening of the shaped polymeric carrier so that the second member is at least partially located within the cavity and is not in direct contact with the first member;
the shaped polymeric carrier is able to guide a direction of expansion of the expandable adhesive; and
the expandable adhesive is an epoxy based structural adhesive which upon expansion and curing fills one or more gaps between at least one interior surface of the first member and at least one exterior surface of the second member, insulates the first member from the second member, and structurally bonds the first member, the second member, and the shaped polymeric carrier together.

2. The connector of claim 1, wherein the shaped polymeric carrier is nylon.

3. The connector of claim 1, wherein the shaped polymeric carrier includes at least four exterior surfaces and a plurality of parallel structures.

4. The connector of claim 1, wherein a plurality of exterior surfaces of the shaped polymeric carrier include at least one opening; and
the shape and size of at least one of the openings corresponds to the shape and size of a portion of the second member for receiving the second member within at least one of the openings.

5. The connector of claim 1, wherein at least two exterior surfaces of the shaped polymeric carrier are a solid wall.

6. The connector of claim 1, wherein at least two exterior surfaces of the shaped polymeric carrier include an opening and are substantially parallel to one another.

7. The connector of claim 1, wherein the first member and second member are configured for a vehicle frame assembly.

8. The connector of claim 1, wherein the shaped polymeric carrier includes a fastening means.

9. The connector of claim 1, wherein the shaped polymeric carrier includes a separately formed fastening means.

10. The connector of claim 1, wherein the shaped polymeric carrier is sized so that at least one interior surface of the first member's cavity and at least one exterior surface of the second member received within the cavity are distanced apart by a gap of less than about 3 mm.

11. The connector of claim 1, wherein the shaped polymeric carrier has a thickness of less than about 1 mm.

12. The connector of claim 1, wherein the first and second members have different cross-sectional profiles.

13. The connector of claim 1, including a plurality of rectangular openings.

14. The connector of claim 1, wherein the shaped polymeric carrier is rectangular in shape.

15. The connector of claim 1, wherein the shaped polymeric carrier includes a plurality of rib structures.

16. The connector of claim 1, wherein the shaped polymeric carrier is substantially rectangular in shape with at least one exterior corner and the expandable adhesive is applied to at least one of the exterior corners.

17. A connector for joining a first member and a second member of a structure comprising:
a shaped polymeric carrier including:
(i) a cage structure with a plurality of ribs, a plurality of walls, and a plurality of openings; and
(ii) an expandable adhesive;
wherein the shaped polymeric carrier is sized to:
(i) at least partially locate the second member within a cavity of the first member by the first member;
(ii) prevent direct contact between the first member and the second member;
(iii) limit movement of the first member relative to the second member;
(iv) matingly engage at least one of the first or second members prior to connecting the first member with the second member;
wherein the first and second members are connected together by the shaped polymeric carrier whereby the first member receives the shaped polymeric carrier within the cavity and one end of the second member is received within an opening of the shaped polymeric carrier so that the second member is at least partially located within the cavity and not in direct contact with the first member;
the expandable adhesive is an epoxy based structural adhesive which upon expansion and curing fills one or more gaps between at least one interior surface of the first member and at least one exterior surface of the second member, insulates the first member from the second member, and structurally bonds the first member, the second member, and the shaped polymeric carrier together; and
the cage structure of the shaped polymeric carrier guides a directional expansion of the expandable adhesive between the first member the first member and the second member.

18. The connector of claim 17, wherein the shaped polymeric carrier is sized so that at least one interior surface of the first member's cavity and at least one exterior surface of the second member received within the cavity are distanced apart by a gap of less than about 3 mm.

19. The connector of claim 17, wherein the first and second members have different cross-section profiles.

20. The connector of claim 17, wherein the expandable adhesive is applied to at least one exterior corner of the shaped polymeric carrier.

* * * * *

UNITED STATES PATENT AND TRADEMARK OFFICE
CERTIFICATE OF CORRECTION

PATENT NO. : 9,303,670 B2
APPLICATION NO. : 14/198936
DATED : April 5, 2016
INVENTOR(S) : Henry E. Richardson, Jeffery Thomas Shantz and Alex Mangiapane Page 1 of 1

It is certified that error appears in the above-identified patent and that said Letters Patent is hereby corrected as shown below:

Claims

Column 8, Claim 17, Line 43, "the first member the first member" should be "the first member".

Signed and Sealed this
Seventh Day of June, 2016

Michelle K. Lee
*Director of the United States Patent and Trademark Office*